United States Patent
Foglia et al.

(10) Patent No.: US 11,970,983 B2
(45) Date of Patent: Apr. 30, 2024

(54) ARRANGEMENT FOR AN AIRCRAFT TURBINE ENGINE HAVING IMPROVED LUBRICATION, THE ARRANGEMENT COMPRISING A SHAFT ROTATABLY COUPLED TO A FOLLOWING MEMBER BY MEANS OF SPLINES

(71) Applicants: SAFRAN AIRCRAFT ENGINES, Paris (FR); SAFRAN TRANSMISSION SYSTEMS, Colombes (FR)

(72) Inventors: Matthieu Bruno François Foglia, Moissy-cramayel (FR); Serge René Morreale, Moissy-cramayel (FR); Adrien Louis Simon, Moissy-cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/997,771

(22) PCT Filed: Apr. 23, 2021

(86) PCT No.: PCT/FR2021/050703
§ 371 (c)(1),
(2) Date: Nov. 2, 2022

(87) PCT Pub. No.: WO2021/224557
PCT Pub. Date: Nov. 11, 2021

(65) Prior Publication Data
US 2023/0160345 A1 May 25, 2023

(30) Foreign Application Priority Data

May 4, 2020 (FR) .................................... 2004373

(51) Int. Cl.
*F01D 5/02* (2006.01)
*F02C 7/36* (2006.01)

(52) U.S. Cl.
CPC ................. *F02C 7/36* (2013.01); *F01D 5/026* (2013.01); *F05D 2220/323* (2013.01); *F05D 2260/40311* (2013.01); *F05D 2260/98* (2013.01)

(58) Field of Classification Search
CPC .... F01D 5/02; F01D 25/18; F02C 7/32; F02C 7/06; F05D 2260/40311; F05D 2260/98
See application file for complete search history.

(56) References Cited

U.S. PATENT DOCUMENTS

2016/0003090 A1\* 1/2016 Lin ......................... F02C 3/107
475/159
2019/0292942 A1 9/2019 Kallianteris et al.
(Continued)

FOREIGN PATENT DOCUMENTS

| EP | 3 557 031 A1 | 10/2019 |
| FR | 2 987 402 A1 | 8/2013 |
| FR | 3 086 343 A1 | 3/2020 |

OTHER PUBLICATIONS

International Search Report dated Sep. 9, 2021, in PCT/FR2021/050703, filed on April 23, 2021, citing documents 1-3 & 15-16 therein, 2 pages.
(Continued)

*Primary Examiner* — Brian P Wolcott
*Assistant Examiner* — Maxime M Adjagbe
(74) *Attorney, Agent, or Firm* — Oblon, McClelland, Maier & Neustadt, L.L.P.

(57) ABSTRACT

An arrangement for an aircraft turbine engine, including a shaft and a follower element rotatably coupled to the shaft by a spline connection, the arrangement including upstream and downstream connections for radially centring the fol- (Continued)

lower element relative to the shaft; means for spraying a lubricant into a collection cavity; a passage for receiving lubricant, which passage opens into the collection cavity and into a cavity for lubricating the splines which is partially defined by the upstream and downstream radial centring connections; and a passage for discharging lubricant, which passage opens into the cavity for lubricating the splines and outside the arrangement.

9 Claims, 3 Drawing Sheets

(56) References Cited

U.S. PATENT DOCUMENTS

2019/0323353 A1    10/2019    Cooper
2020/0088053 A1*    3/2020    Fiore .................... F16J 15/3404

OTHER PUBLICATIONS

French Search Report dated Dec. 23, 2020 in French Patent Application No. 2004373 filed May 4, 2020, citing documents 2-3 & 15-16 therein, 2 pages (with Translation of Categories).

* cited by examiner

ARRANGEMENT FOR AN AIRCRAFT TURBINE ENGINE HAVING IMPROVED LUBRICATION, THE ARRANGEMENT COMPRISING A SHAFT ROTATABLY COUPLED TO A FOLLOWING MEMBER BY MEANS OF SPLINES

TECHNICAL FIELD

The present invention relates to the field of aircraft turbine engines. It more particularly relates to an arrangement for being implemented in such turbine engines, this arrangement comprising a rotating shaft rotatably coupled to a following member via a splined connection.

The invention relates in particular to the management of the lubrication of the constituent members of such an arrangement.

The invention applies preferably to turbine engines comprising a fan driven by a reduction gear, as is known for example from document FR 2 987 402 A1.

STATE OF PRIOR ART

In aircraft turbine engines, arrangements are provided in which a rotating shaft is rotatably coupled to a following member, via a splined connection. For example, it is a drive shaft rotatably coupled to a gear wheel of a speed reduction gear driving a fan of the turbine engine. According to another example, this gear wheel may be a mechanical power take-off gear on the drive shaft to which it is rotatably coupled.

Typically, this type of arrangement is lubricated by being immersed in an oil bath with very little renewal. However, this conventional lubrication technique may not be sufficient if the torque to be transmitted within such arrangements increases. Indeed, such an increase generates higher contact pressures between splines, with a need to discharge energy dissipated at these contacts.

This lubrication problem is in addition to the problem of relative axial displacements between the drive shaft and the following member. Such displacements can be caused by differential thermal expansion effects between the component members of the arrangement, especially when the drive shaft has a long axial length.

DISCLOSURE OF THE INVENTION

In order to address at least partially the above-mentioned drawbacks, one object of the invention is first an arrangement for an aircraft turbine engine comprising a shaft rotating along an axis of rotation, as well as a following member centered on the axis of rotation and rotatably coupled to the shaft by a splined connection comprising first splines integral with the following member, as well as second splines integral with the rotating shaft and cooperating with said first splines. According to the invention, the arrangement additionally includes:

- on either side of the splined connection, respectively an upstream connection for radially centering the following member relative to the shaft, and a downstream connection for radially centering the following member relative to the shaft, the upstream and downstream radial centering connections being axially sliding;
- means for spraying a lubricant into a lubricant collection cavity;
- at least one lubricant intake passage made through the rotating shaft or the following member, the lubricant intake passage opening on the one hand into said lubricant collection cavity, and on the other hand into a spline lubrication cavity delimited in part by the upstream and downstream radial centering connections; and
- at least one lubricant discharge passage made through the rotating shaft or the following member, the lubricant discharge passage opening on the one hand into said spline lubrication cavity, and on the other hand externally to the arrangement.

By means of the two radial centering connections, each of which is sliding in the axial direction, the arrangement according to the invention makes it possible to cope with relative axial displacements between the rotating shaft and the following member, for example as a result of differential thermal expansion.

In addition, since radial centering is no longer affected by the splines, large radial clearances can be provided at the end of these splines, promoting passage of a stream of lubricant capable of discharging the part of the power dissipated at the contacts between these splines.

Furthermore, the design provided for the arrangement according to the invention allows not only satisfactory lubrication of the splines, but also efficient lubrication of the two radial centering connections.

The invention moreover has at least one of the following optional characteristics, taken individually or in combination.

Preferably:

- the upstream radial centering connection is made by a first upstream centering portion provided on the following member, as well as a second upstream centering portion provided on the shaft and cooperating with the first upstream centering portion so as to define an upstream radial clearance within the upstream radial centering connection;
- the downstream radial centering connection is formed by a first downstream centering portion provided on the following member, as well as a second downstream centering portion provided on the shaft and cooperating with the first downstream centering portion so as to define a downstream radial clearance within the downstream radial centering connection; and
- each of the upstream and downstream radial clearances is strictly less than the radial clearances at the end of each of the first and second splines.

Preferably, the lubricant intake passage(s) is/are made through the first upstream centering portion provided on the following member, and/or the lubricant discharge passage(s) is/are made through the second downstream centering portion provided on the rotating shaft. Nevertheless, any other solution remains possible, without departing from the scope of the invention.

Preferably, the lubricant collection cavity is annular and centered on the axis of rotation, said collection cavity being radially inwardly open, and radially outwardly closed.

Preferably, the lubricant collection cavity is made within the following member. Alternatively, this cavity could be made of an insert to the following member.

Preferably, the following member is arranged around the rotating shaft.

Preferably, the following member is a gear wheel.

The invention also relates to an aircraft turbine engine comprising such an arrangement.

Preferably, the turbine engine includes a fan driven by a reduction gear equipped with at least one gear wheel forming the following member of the arrangement.

Finally, one object of the invention is a method for lubricating such an arrangement, implemented by spraying lubricant into the lubricant collection cavity, such that:

the lubricant passes through said at least one lubricant intake passage to penetrate the spline lubrication cavity, from which the lubricant separates into a main lubrication stream of the first and second splines, and a first connection lubrication stream, passing through the upstream connection from inside to outside the spline lubrication cavity;

then, after passing through the splines, the main lubrication stream of the first and second splines separates into a leakage stream through said at least one lubricant discharge passage, and a second connection lubrication stream, passing through the downstream connection from inside to outside the spline lubrication cavity.

Further advantages and characteristics of the invention will become apparent from the non-limiting detailed description below.

BRIEF DESCRIPTION OF THE DRAWINGS

This description will be made with regard to the attached drawings, among which.

DETAILED DISCLOSURE OF PREFERRED EMBODIMENTS

Figure 1:
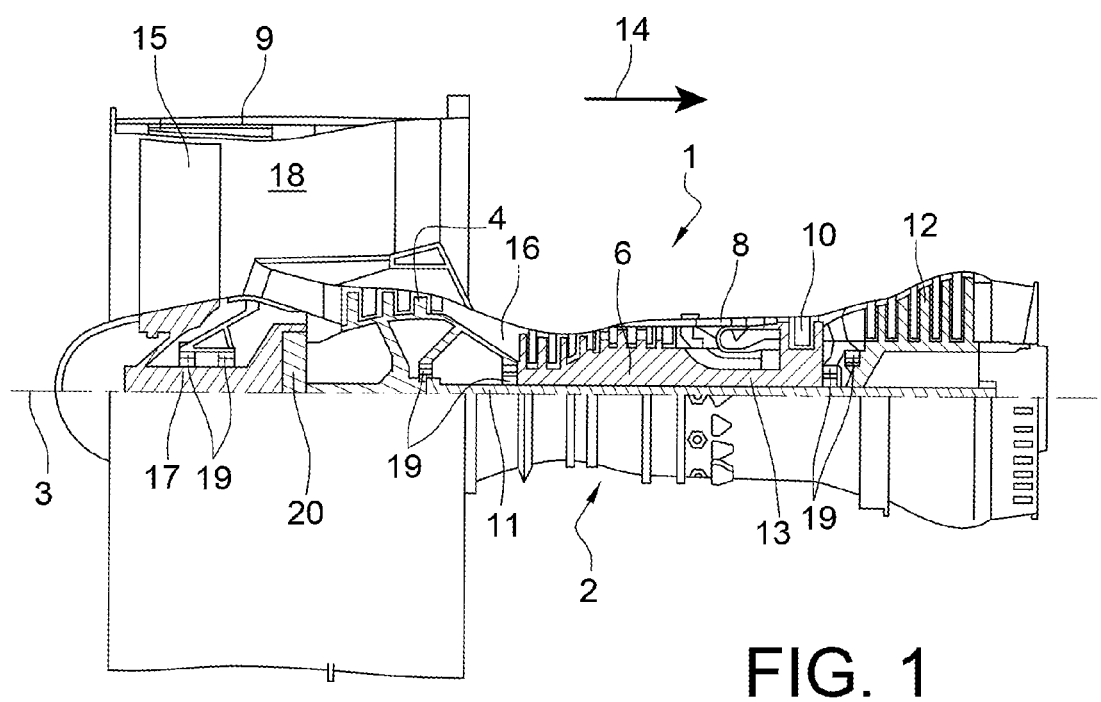
FIG. 1 represents a schematic side view of a turbojet engine according to the invention.

With reference to FIG. 1, a twin spool turbojet engine 1 is represented. The turbojet engine 1 conventionally includes a gas generator 2, on either side of which a low-pressure compressor 4, and a low-pressure turbine 12 are arranged. The gas generator 2 comprises a high-pressure compressor 6, a combustion chamber 8 and a high-pressure turbine 10. Hereinafter, the terms "upstream" and "downstream" are considered along a main flow direction of the gases through the turbojet engine, this direction being shown by arrow 14. The low-pressure compressor 4 and the low-pressure turbine 12 form a low-pressure spool, and are connected to each other by a low-pressure shaft 11 centered on a central longitudinal axis 3 of the turbojet engine. Similarly, the high-pressure compressor 6 and the high-pressure turbine 10 form a high-pressure spool, and are connected to each other by a high-pressure shaft 13 centered on the axis 3 and arranged around the low-pressure shaft 11. The shafts are supported by roller bearings 19, which are lubricated by being arranged in oil enclosures. The same applies to the hub of the fan 17, which is also supported by roller bearings 19.

Figure 2:
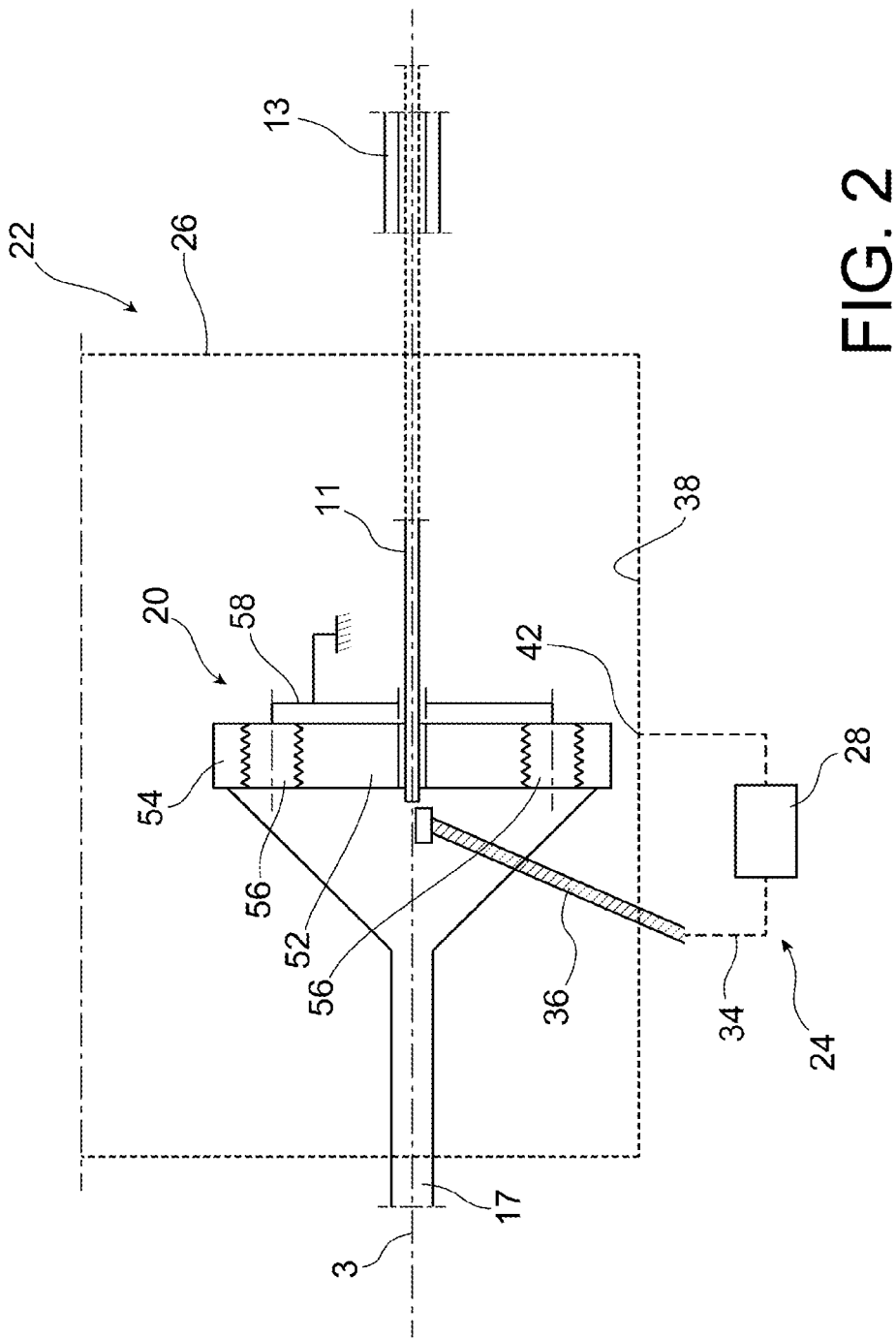
FIG. 2 represents a schematic side view of a part of the turbojet engine shown in the previous figure.

The turbojet engine 1 moreover includes, at the front of the gas generator 2 and the low-pressure compressor 4, a fan 15 which is here arranged directly behind an engine air inlet cone. The fan 15 is rotatable along the axis 3, and surrounded by a fan casing 9. The fan 15 is not driven directly by the low-pressure shaft 11, but is driven indirectly by the low-pressure shaft 11 via a reduction gear 20, which allows it to rotate at a slower speed. Furthermore, conventionally, the turbojet engine 1 defines a primary duct 16 through which a primary stream is to pass, as well as a secondary duct 18 through which a secondary stream radially outwardly located with respect to the primary stream, is to pass. With reference now to FIG. 2, a part 22 of the turbojet engine is represented schematically, comprising the reduction gear 20 and the low-pressure shaft 11, as well as a lubrication system 24.

More precisely, the lubrication system 24 first includes an oil enclosure 25 enclosing the reduction gear 20, through which the low-pressure shaft 11 passes. It also includes a lubricant tank 28, as well as a feed pump (not represented) which can be mechanically driven by the rotation of the high-pressure shaft 13 via a known transmission system. Alternatively, the feed pump may be decoupled from the shaft 13 and rotatably driven by an electric motor so that its lubricant flow rate may be adjusted by controlling the speed of rotation of the pump by controlling the speed of the electric motor. The tank 28 communicates with a lubricant intake duct 34, one end of which communicates with means 36 for spraying a lubricant. These means 36 preferably take the form of one or more nozzles, or similar means. They are configured to spray lubricant onto all or part of the gearing of the reduction gear 20.

The enclosure 26 has a bottom 38, and a lubricant recovery duct 40 communicates with a low point 42 of the enclosure bottom 38. It allows the lubricant that has been previously sprayed by means 36 onto the reduction gear to be collected by gravity and redirected to the tank 28.

The reduction gear 20 is centered on the geometric axis 3 of the low-pressure shaft 11, which is also the geometric axis of the hub of the fan 17. Also, this axis 3 corresponds to the axis of rotation of the fan 17 and the low-pressure shaft 11. The reduction gear 20 includes an epicyclic gear train, which in the configuration represented is conventionally equipped with a gear wheel 52 forming an internal sun gear, centered on the axis 3. The internal sun gear 52 is rotatably coupled about an upstream end of the low-pressure shaft 11, in a manner specific to the invention which will be detailed below.

The reduction gear moreover comprises an external sun gear, also called the external ring gear 54, corresponding to the output member of the reduction gear which is rotatably integral with the hub of the fan 17. Finally, it includes a fixed planet carrier 58, supporting an annular row of planet gears 56 arranged between the sun gears 52, 54. Other configurations are of course possible for the reduction gear, in particular with a rotating planet carrier corresponding to the output member of the reduction gear, a rotating internal sun gear and a fixed external ring gear.

Under normal operating conditions of the turbojet engine, the high-pressure shaft 13 rotates at a sufficiently high speed to drive the feed pump of the system 24. Lubricant then flows at a high flow rate and pressure through the lubricant intake duct 34, before being sprayed by the means 36 onto the gearing of the reduction gear 20. The lubricant then flows by gravity to the enclosure bottom 38, to be collected by the recovery duct 40, and then reinjected into the system.

Figure 3:
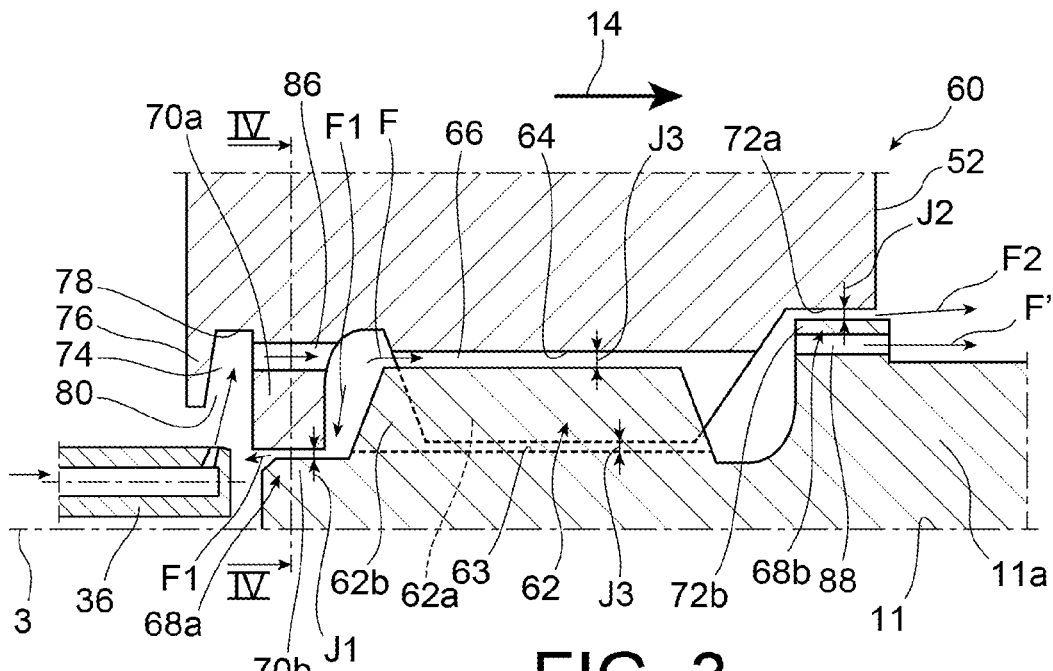
FIG. 3 represents a partial cross-sectional view of an arrangement according to one preferred embodiment of the invention, implemented within the turbojet engine shown in FIGS. 1 and 2.

FIG. 3 represents an arrangement 60 according to one preferred embodiment of the invention, this arrangement being integrated with the turbojet engine part 22 shown in FIG. 2.

The arrangement 60 includes a drive shaft formed by the low-pressure shaft 11, a following member formed by the internal sun gear 52, and finally the nozzle 36.

The sun gear 52, centered on the axis 3 and arranged around an upstream end of the low-pressure shaft 11, is rotatably coupled to the latter via a splined connection 62. More precisely, the connection 62 includes first splines 62*a* integral with the sun gear 52 and radially inwardly projecting, as well as second splines 62*b* integral with the shaft 11 and radially outwardly projecting. The first and second splines 62*a*, 62*b* cooperate together in a circumferential direction. On the other hand, at the end of each of the first and second splines 62*a*, 62*b*, there is a fairly large radial clearance J3, defined respectively with an external surface 63 of the shaft 11, and an internal surface 64 of the sun gear 52. As is visible in FIG. 3, it is from these surfaces 64 and 63 that the splines 62*a*, 62*b* inwardly and outwardly protrude respectively.

The external surface 63 of the shaft 11 and the internal surface 64 of the sun gear 52 thus radially delimit an annular lubrication cavity 66 of the splines 62*a*, 62*b*, centered on the axis 3. Axially, this annular cavity 66 is wholly or partly delimited by two connections for radially centering the shaft 11 and the sun gear 52, these two connections being arranged on either side of the splines 62*a*, 62*b*.

Firstly, there is an upstream connection 68*a* for radially centering the sun gear 52 relative to the shaft 11, and then a downstream connection 68*b*, still for radially centering the sun gear 52 relative to the shaft 11. These two connections 68*a*, 68*b* are made to slide axially, in particular to absorb differential thermal expansions between the sun gear 52 and the shaft 11 in the axial direction. Preferably, these connections 68*a*, 68*b* also have a small radial clearance, also to absorb the radial differential thermal expansions between the sun gear 52 and the shaft 11. This small radial clearance also allows for lubrication of the connections 68*a*. 68*b*, as will be described below.

More precisely, the upstream centering connection 68*a* is made by a first upstream centering portion 70*a*, in the form of an annular wall or flange protruding radially inwardly from the internal surface 64 of the sun gear 52. It is also made using a second upstream centering portion 70*b*, corresponding to a part of the external surface 63 of the shaft 11. Between these two upstream portions 70*a*, 70*b*, the upstream radial clearance 11 is defined, corresponding to the radial clearance of the upstream connection 68*a*. Similarly, the downstream centering connection 68*b* is made by a first downstream centering portion 72*a*, corresponding to a part of the internal surface 64 of the sun gear 52. It is also made by a second downstream centering portion 72*b*, in the form of an annular wall or collar radially outwardly protruding from the external surface 63 of the shaft 11. It is noted that the annular wall 72*b* extends from a portion 11*a* of the shaft 11, which has a diameter greater than that of the upstream end of the shaft bearing the second splines 62*b*. Thus, the annular wall 72*b* radially outwardly extends beyond the second splines 62*b*, and it is at this same wall 72*b* that the break in diameter between the portion 11*a* of the shaft 11, and its upstream end incorporating the second splines 62*b* is marked. Between the two upstream portions 72*a*, 72*b* forming the downstream connection 68*b*, the downstream radial clearance J2 is also defined, corresponding to the radial clearance of this downstream connection 68*b*.

With the purpose in particular of ensuring that the splines 62*a*, 62*b* do not contribute to the radial centering of the sun gear 52 relative to the shaft 11, it is ensured that the upstream and downstream radial clearances 11, J2 are strictly less than the radial clearances 13 at the end of the splines. This feature also makes it possible to provide a main lubrication stream through the splines 62*a*, 62*b*, as will be described below.

At the upstream end of the sun gear 52, the latter delimits an annular cavity 74 for collecting the lubricant sprayed by the nozzle 36. This annular cavity 74 is delimited axially upstream by an annular rim 76 projecting radially inwardly from the internal surface 64 of the sun gear 52, and delimited downstream by the first upstream centering portion 70*a*. The cavity 74 is closed radially inwardly by a bottom 78 akin to a portion of the internal surface 64 of the sun gear 52, while it remains open radially. In fact, a radial annular opening 80 faces radially a spraying end of the nozzle 36, so that the lubricant sprayed by the nozzle 36 easily penetrates the annular collection cavity 74 centered on the axis 3. Moreover, the first upstream centering portion 70*a* has one or more lubricant intake passages 86, for example axially oriented, passing therethrough. Each passage 86 thus opens on the one hand upstream into the lubricant collection cavity 74, preferably in the vicinity of the bottom, 78, and on the other hand downstream into the cavity 66 for lubricating the splines 62*a*, 62*b*.

Furthermore, the second downstream centering portion 72*b* has one or more lubricant discharge passages 88 passing therethrough, for example axially oriented. Each passage 88 thus opens on the one hand upstream into the lubrication cavity 66 of the splines 62*a*, 62*b*, and on the other hand downstream, externally to the arrangement 60, preferably into the aforementioned oil enclosure 26.

Figure 4:
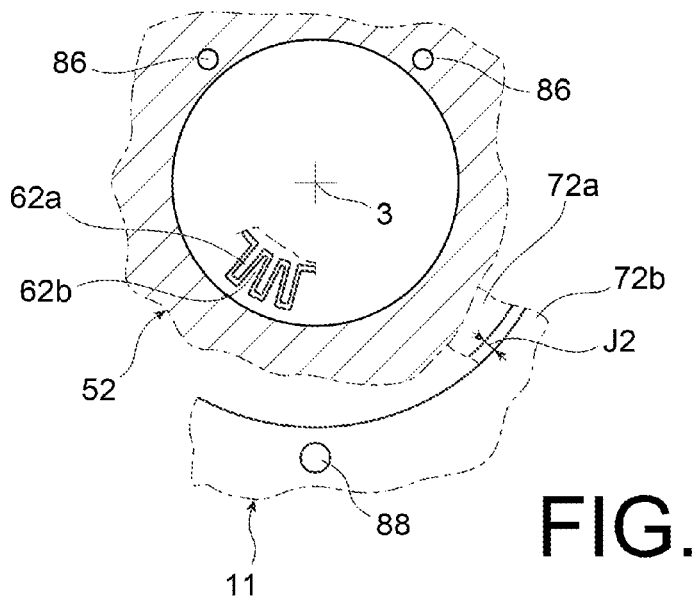
FIG. 4 represents a partial cross-sectional view taken along line IV-IV of FIG. 3.

As is depicted in FIG. 4, each lubricant discharge passage 88 assumes an angular position, with respect to the axis 3, which is different from the angular position of each lubricant intake passage 86. An angular offset of 120° can be assumed between these passages 86, 88, as represented in FIG. 4. Other angle values are of course possible, for example 90°. This angular offset ensures that the lubricant is maintained when the turbojet engine is stopped, whatever the angular position of the rotating assembly 11, 52. This feature avoids the risk of the turbojet engine starting dry, by ensuring a minimum of lubricant in the splines 62*a*, 62*b*.

Returning to FIG. 3, the operation of the arrangement 60 and the method for its lubrication will be described.

The lubricant, preferably oil, is first sprayed from the nozzle 36 into the collection cavity 74. The rotation of the rotating assembly 11, 52 causes a centrifugal force to force the lubricant towards the bottom 78 of the collection cavity 74. All of the lubricant collected in the cavity 74 then passes downstream, through the lubricant intake passages 86 to penetrate the lubrication cavity 66 of the splines 62*a*, 62*b*.

After penetrating the cavity 66, the lubricant separates into a main lubrication stream F of the first and second splines 62*a*, 62*b*, and a first connection lubrication stream F1, passing through the upstream connection 68*a* from inside to outside the cavity 66. The dimensioning of the members of the arrangement 60 is made such that the first stream F1 through the upstream connection 68*a* remains quite small compared to the main stream F to lubricate the first and second splines 62*a*, 62*b*. For example, the first stream F1 through the upstream connection 68*a* represents about ⅕ of the total flow rate introduced into the cavity 66, while the main stream F represents about ⅘ of this total flow rate.

After passing through the splines 62*a*, 62*b*, the main lubrication stream F separates into a leakage stream F' through the lubricant discharge passage 88, and a second connection lubrication stream F2, passing through the downstream connection 68*b* from inside to outside the cavity 66. The lubricant of the leakage stream F' is thus extracted axially from the arrangement 60 through the discharge passage 88 and then falls back preferentially by gravity into the bottom of the aforementioned oil enclosure 26.

Here again, the dimensioning of the members of the arrangement 60 is made such that the second stream F2 through the downstream connection 68b remains quite small compared to the leakage stream F' through the lubricant discharge passage 88. For example, the second stream F2 through the upstream connection 68b also represents about ⅕ of the total flow rate introduced into the cavity 66, while the leakage stream r represents about ⅗ of the total flow rate.

In general, the dimensioning of the members of the arrangement 60 is also made such that that non-zero flow rates are observed for each of the lubrication streams F1, F2 and F', whatever the operating conditions of the turbojet engine.

Of course, various modifications may be made by the person skilled in the art to the invention just described, solely by way of non-limiting examples, the scope of which is delimited by the appended claims.

The invention claimed is:

1. An arrangement for an aircraft turbine engine comprising:
    a shaft rotating about an axis of rotation:
    a following member centered on the axis of rotation and rotatably coupled to the shaft by a splined connection comprising first splines integral with the following member, and second splines integral with the rotating shaft and co-operating with said first splines:
    on either side of the splined connection, respectively an upstream connection for radially centering the following member relative to the shaft, and a downstream connection for radially centering the following member relative to the shaft, the upstream and downstream radial centering connections being axially sliding;
    a device for spraying a lubricant into a lubricant collection cavity;
    a lubricant intake passage made through the rotating shaft or the following member, the lubricant intake passage opening into said lubricant collection cavity, and opening into a spline lubrication cavity delimited in part by the upstream and downstream radial centering connections; and
    a lubricant discharge passage made through the rotating shaft or the following member, the lubricant discharge passage opening into said spline lubrication cavity, and opening externally to the arrangement, wherein:
    the upstream radial centering connection is made by a first upstream centering portion provided on the following member, and a second upstream centering portion provided on the shaft and cooperating with the first upstream centering portion so as to define an upstream radial clearance within the upstream radial centering connection,
    the downstream radial centering connection is formed by a first downstream centering portion provided on the following member, and a second downstream centering portion provided on the shaft and cooperating with the first downstream centering portion so as to define a downstream radial clearance within the downstream radial centering connection, and
    each of the upstream and downstream radial clearances is strictly less than radial clearances at an end of each of the first and second splines.

2. The arrangement according to claim 1, wherein at least one of the lubricant intake passage is made through the first upstream centering portion provided on the following member, and the lubricant discharge passage is made through the second downstream centering portion provided on the rotating shaft.

3. The arrangement according to claim 1, wherein the lubricant collection cavity is annular and centered on the axis of rotation, said collection cavity being radially inwardly open, and radially outwardly closed.

4. The arrangement according to claim 1, wherein the lubricant collection cavity is made within the following member.

5. The arrangement according to claim 1, wherein the following member is arranged around the rotating shaft.

6. The arrangement according to claim 1, wherein the following member is a (Fear wheel.

7. An aircraft turbine engine comprising the arrangement according to claim 1.

8. The turbine engine according to claim 7, comprising a fan driven by a reduction gear equipped with at least one gear wheel forming the following member of the arrangement.

9. A method for lubricating the arrangement according to claim 1, the method comprising spraying lubricant into the lubricant collection cavity, such that:
    the lubricant passes through said lubricant intake passage to penetrate the spline lubrication cavity, from which the lubricant separates into a main lubrication stream of the first and second splines, and a first connection lubrication stream, passing through the upstream connection from inside to outside the spline lubrication cavity;
    then so that after passing through the splines, the main lubrication stream of the first and second splines separates into a leakage stream through said at least one lubricant discharge passage, and a second connection lubrication stream, passing through the downstream connection from inside to outside the spline lubrication cavity.

* * * * *